United States Patent [19]
Bafford

[11] Patent Number: 5,880,238
[45] Date of Patent: Mar. 9, 1999

[54] SOLID INK RESINS SUBSTANTIALLY FREE OF HAZARDOUS AIR POLLUTANTS

[75] Inventor: Richard Anthony Bafford, Macungie, Pa.

[73] Assignee: Air Products and Chemicals, Inc., Allentown, Pa.

[21] Appl. No.: 939,567

[22] Filed: Sep. 29, 1997

[51] Int. Cl.⁶ .................................................. C08F 20/10
[52] U.S. Cl. ................................................................ 526/318
[58] Field of Search ............................................. 526/318

[56] References Cited

U.S. PATENT DOCUMENTS

| | | |
|---|---|---|
| 3,392,155 | 7/1968 | Muskat .................................... 260/78.5 |
| 4,025,484 | 5/1977 | Evani et al. . |
| 4,151,341 | 4/1979 | Lalk . |
| 4,496,686 | 1/1985 | Ansel ....................................... 526/318 |
| 5,130,369 | 7/1992 | Hughes et al. . |
| 5,237,024 | 8/1993 | Allberry et al. ......................... 526/318 |
| 5,250,644 | 10/1993 | Tokunaga et al. ....................... 526/318 |

FOREIGN PATENT DOCUMENTS

| | | | |
|---|---|---|---|
| 0513110 | 5/1955 | Canada ................................... | 526/318 |
| 814528 | 6/1969 | Canada . | |
| 0653443 | 5/1951 | United Kingdom .................... | 526/318 |
| 0701992 | 1/1954 | United Kingdom .................... | 526/318 |
| 0759667 | 10/1956 | United Kingdom .................... | 526/318 |
| 0761038 | 11/1956 | United Kingdom .................... | 526/318 |
| 0783677 | 9/1957 | United Kingdom .................... | 526/318 |
| 1171387 | 11/1969 | United Kingdom .................... | 526/318 |

*Primary Examiner*—Bernard Lipman
*Assistant Examiner*—N. Sarofin
*Attorney, Agent, or Firm*—Russell L. Brewer

[57] ABSTRACT

The invention relates to improved carboxylated styrenic polymers suited for use in the graphic arts industries as dispersants for pigments and varnishes. The base polymer comprises polymerized units of styrene and an $\alpha,\beta$-unsaturated monocarboxylic acid, with said polymer incorporating hydrophilic functionality. The improvement in the polymer composition comprises the polymerized incorporation of hydrophilic functionality based upon the half acid ester of an $\alpha,\beta$-unsaturated dicarboxylic acid or anhydride thereof and a polyethylene glycol monoether having greater than three ethylene oxide units. The half ester not only provides surfactant properties to the polymer through the incorporation of the polyethylene glycol ether but also provides carboxyl functionality necessary for water dispersibility. The number average molecular weight is from 1,500 to 20,000 and the acid numbers for these polymers typically range from 125 to 300.

12 Claims, 3 Drawing Sheets

SOLID INK RESINS SUBSTANTIALLY FREE OF HAZARDOUS AIR POLLUTANTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

In the Graphic Arts Industry, low molecular weight ($M_n$<20,000), alkali-soluble, high $T_g$ (>50° C.), carboxylated styrene polymers have been used as pigment dispersants, overprint varnishes, and for preparing resin fortified latexes for water based inks and coatings. These polymers are very polar due to their carboxyl content and are, therefore, synthesized in a polar solvent. Conventional solvents employed in their production include low boiling alcohols such as ethyl or isopropyl alcohol, ketones such as methyl isobutyl ketone and high boiling ethylene glycol based solvents such as diethylene glycol monoethyl ether (DEGEE) or diethylene monoethyl ether acetate (DEGEEA). The ethylene glycol based solvents have been preferred because (a) they are water-soluble and since the resins are used as their ammoniacal solutions residues of non-water-soluble solvents cause the solution to be hazy, (b) the solvents afford an ability to polymerize at a high temperature (the glycol solvents are used at 150° to 250° C.) which leads to greater chain transfer and lower molecular weight, (c) polymerization at a high temperature permits the use of lower cost, more thermally stable, safer-to-use and store organic peroxides such as di-t-butyl peroxide, t-butyl perbenzoate, and 2,5-di-t-butylperoxy-2,5-dimethylhexane, and (d) the presence of the pendant glycol groups incorporated into the polymer by esterification (of the solvent) with the carboxylic acid groups or by chain transfer enhance the performance of the resin. (Ink World, 2 (6), 1996, p 32–37)

Although historically, the industry choice has been the ethylene glycol based solvents, such ethylene glycol based solvents have been designated hazardous air pollutants (HAPs). Several have been determined to be teratogenic. Threshold reporting levels for accidental spills are as low as one pound. Therefore, the printing ink industry is demanding resins which are completely free of ethylene glycol based solvents because it is virtually impossible to completely remove all traces of these ethylene glycol based solvents from the solution polymerized resin.

Representative patents exemplifying this technology are as follows:

Canadian Patent 814,528 discloses the production of alkali soluble resins which are described as having a number average molecular weight of from about 2,000 to 3,600 and a high acid number which, in alkali solubilized form, are useful as emulsifiers and leveling agents. Preferred polymers are based upon styrene and (meth)acrylic acid which are polymerized in the presence of a chain transfer agent or chain transfer solvent. Chain-transfer reaction solvents employed in the process include methyl isobutyl ketone, xylene, methyl isobutyl carbinol and the like.

U.S. Pat. No. 4,151,341 discloses low molecular weight interpolymers containing lower alkyl capped poly (oxyethylene) ether groups which are employed as aqueous dispersing agents for particulate matter, e.g., difficult-to-disperse finely divided inorganic solids such as calcium carbonate. The polymer is based upon a hydrophobic monomer such as styrene, a copolymerizable ethylenically unsaturated carboxylic acid, such as acrylic or methacrylic acid, and an alkenyl benzyl ether, where the ether is the alkyl capped poly(oxyethylene) ether. Polymers based upon styrene, maleic anhydride and a vinyl benzyl ether having pendent methyl capped ethoxylated nonylphenol groups are disclosed. Also disclosed are low molecular weight styrene, maleic anhydride copolymers wherein a portion of the maleic anhydride repeating units are half esterified with a polyethylene glycol monomethyl ether.

U.S. Pat. No. 4,025,484 discloses dispersions of finely divided particulate solids in an organic medium stabilized by addition of a polymeric dispersant which is based upon a copolymer of styrene, maleic anhydride and a vinyl benzyl ether of an ethoxylated nonylphenol. Alkyl half esters of maleic and fumaric acids as well as alkyl half amides of maleic and fumaric acids, acrylic and methacrylic acids, are suggested as suitable for producing the polymeric dispersant.

U.S. Pat. No. 3,392,155 discloses low molecular weight styrene/maleic anhydride copolymers esterified with monohydric polyether alcohols. The copolymers are based upon styrene and maleic compounds of very low molecular weight, e.g., those having a solution viscosity up to only 2.0 centistokes (10 g copolymer/100 ml acetone). Preferred copolymers are terminated by a chain terminating solvent, which is an alkyl-substituted aromatic organic compound such as an isopropyl-substituted benzene or ketone. Monohydroxypolyoxyalkylene glycols used as the esterifying ether alcohols have molecular weights which range from about 120 to 10,000, and examples include diethylene glycol monobutyl ether and ethylene oxide condensation products of primary, secondary and tertiary alcohols. Example 8 shows production of a copolymer of styrene and the maleic acid half ester of polyethylene glycol monomethyl ether having a molecular weight of about 350.

U.S. Pat. No. 5,130,369 discloses the production of functionalized polymeric compositions by polymerizing an ethylenically unsaturated functional monomer in a solvent including a reactive compound. An example of a functional/ reactive group is a carboxylic acid/primary alcohol group. Ethylenically unsaturated monomers having carboxyl functionality include acrylic and methacrylic acid and α,β-unsaturated dicarboxylic acids and their anhydrides, such as itaconic, maleic and fumaric acid, and their anhydrides. Examples of hydroxy functional surface active compounds include alkyl aryloxypoly(ethyleneoxy)ethanol and block copolymers of polyethylene oxide and polypropylene oxide, e.g., such as those sold under the trademark Pluronic, and the like. Exemplary copolymers are based upon styrene, acrylic acid and a $C_{12}$ alkoxy(ethylene oxide)ethanol, or styrene, acrylic acid and a polyethylene glycol.

BRIEF SUMMARY OF THE INVENTION

The invention relates to improved carboxylated styrenic polymers suited for use in the graphic arts industries as dispersants for pigments and varnishes. The base polymer comprises polymerized units of styrene and an α,β-unsaturated monocarboxylic acid, with said polymer incorporating hydrophilic functionality. The improvement comprises incorporating hydrophilic functionality based upon the half acid ester of an α,β-unsaturated dicarboxylic acid or anhydride thereof and a polyethylene glycol monoether having greater than three ethylene oxide units. The half ester not only provides surfactant properties to the polymer through the incorporation of the polyethylene glycol ether but also provides carboxyl functionality necessary for water dispersibility. The number average molecular weight is from 1,500 to 20,000 and the acid numbers for these polymers typically range from 125 to 300.

There are several advantages associated with the carboxylated styrenic polymers described herein and used as dispersants for pigments in aqueous based inks, etc. and these include:

an ability to offer greater consistency in the level of carboxyl and hydrophilic functionality through the combination of the $\alpha,\beta$-unsaturated carboxylic acid and the half ester of an $\alpha,\beta$-unsaturated dicarboxylic acid or anhydride to meet the resin's use requirements, whether it is used for a pigment dispersant, overprint varnish or latex stabilizer;

an ability to control resin properties through the control of the molar ratio of carboxylic acid to the half acid ester in the polymer;

an ability to reduce the level of hazardous air pollutants in the polymer as compared to prior art dispersants;

an ability to produce pigment dispersants which are superior in performance to those presently used in the industry; and, an ability to eliminate the presence of compounds designated as Hazardous Air Pollutants in the pigment dispersant.

DETAILED DESCRIPTION OF THE INVENTION

The improved carboxylated styrenic polymers suited as pigment dispersants are based upon polymers comprised of polymerized units of styrene and an unsaturated monocarboxylic acid. Major monomers incorporated into these basic polymer backbones include styrene, $\alpha$-methyl styrene, ring substituted alkyl styrenes and unsaturated carboxylic acids capable of being polymerized by free radical polymerization. Examples of unsaturated acids include $C_{3-6}$ $\alpha,\beta$-unsaturated monocarboxylic acids such as acrylic and methacrylic acid, crotonic acid and the like.

The key to the effectiveness of the improved polymers as a pigment dispersant is the incorporation of the half ester of an $\alpha,\beta$-unsaturated dicarboxylic acid or anhydride thereof, the half ester being formed by the reaction of the $\alpha,\beta$-unsaturated dicarboxylic acid or anhydride thereof and at least one polyethylene glycol monoalkyl ether (PEG monoalkyl ether) into the basic polymer backbone. The monoalkyl ethers suitable for reaction with the $\alpha,\beta$-unsaturated dicarboxylic acid or anhydrides such as maleic anhydride to yield the half acid ester include those having three or more ethylene oxide units. These are formed by anionic catalyzed oligomerization of ethylene oxide followed by etherification with a suitable alcohol. The preferred glycols are those having four or more ethylene oxide units (4-ethylene oxide) and capped with a lower $C_{1-6}$ alkanol (R) group such as methyl, ethyl, propyl or butyl. Commercially PEG monoalkyl ethers are available under the product names such as Arcosolv™ E-series manufactured by ARCO Chemical Company, the Dowanol™ E-series manufactured by the Dow Chemical Company, and the Carbowax™ methoxy polyethylene glycols manufactured by the Union Carbide Corporation and these are incorporated by reference. Product sheets disclose these have a number average molecular weight from 178 to 5,000, preferably 300 to 600. Reference: Carbowax®, Union Carbide Corporation, July 1996.

The total carboxylic acid content in these basic polymers should be sufficient to render the resulting polymer soluble in water. To accomplish desired water solubility the equivalent weight of the carboxylated polymer will range from 140 to 560. Alternatively stated, the acid number as measured in methanol, (Example 1) will range broadly from 100 to 400 and preferably 125 to 300.

Water solubility is imparted to the polymer by neutralizing the carboxylic group with a fixed base such as sodium or potassium hydroxide or with a volatile base such as ammonia or lower alkyl amines. Bases typically used in the Graphic Arts industry include sodium hydroxide, aqua ammonia, and $C_{2-10}$ aminoalcohols such as ethanolamine, diethanolamine, triethanolamine, N,N-dimethylaminoethanol, and combinations thereof.

The molar ratio of $\alpha,\beta$-unsaturated monocarboxylic acid, to the half ester of $\alpha,\beta$-unsaturated dicarboxylic acid or anhydride is generally within a range of from 30:1 to 1:1, preferably 25:1 to 3:1. The molar ratio of carboxylic acid anhydride to the polyethyleneglycol monoalkyl ether must be at least 1 to insure conversion of the glycol ether to the half acid ester. However, excess dicarboxylic acid or anhydride can be used to provide carboxyl functionality. In this case the amount of $\alpha,\beta$-unsaturated monocarboxylic acid, e.g., acrylic acid, would be reduced in order to maintain a given acid number.

The balance of the polymer is comprised of monocarboxylic acid containing monomers. The molar percentage of the half ester of $\alpha,\beta$-unsaturated dicarboxylic acid to non-carboxylated monomers, such as styrene and $\alpha$-methylstyrene, is from 35 to 6. Alternating copolymers may the result when the molar ratio of $\alpha,\beta$-unsaturated dicarboxylic acid or anhydride to styrene is close to 1:1. When styrene is in excess, there can be some polystyrene formation. If the maleic acid or maleic anhydride is incorporated in high amounts, vis-à-vis the $\alpha,\beta$-unsaturated monocarboxylic acid, the polymer can become unstable in aqueous systems. By incorporating $\alpha,\beta$-unsaturated monocarboxylic acid into the polymer the backbone becomes random rather than a combination of two polymers, if you will, one having alternating units of styrene and the half ester of maleic anhydride and the other the homopolymer of the $\alpha,\beta$-unsaturated carboxylic acid or styrene.

Minor amounts of other monomers such as the $C_{1-8}$ alkyl esters of (meth)acrylic acid which include methyl methacrylate, ethyl acrylate, butyl acrylate and 2-ethylhexyl acrylate can be used to alter the Tg of the polymer and provide appropriate properties to the polymer. However, generally the polymer consists essentially of styrene, $\alpha$-methyl styrene, acrylic acid and maleic half ester.

Preferred carboxylated styrenic polymers are based upon the following monomer compositions where the mole percent range for these monomers based upon one mole polymer and it assumes the calculations are based upon 100% conversion of the monomers charged to the polymerization zone. These percentages are as follows:

| Monomer | Mole Percentage Range Preferred | |
|---|---|---|
| | Broad | Preferred |
| Styrene | 20 to 60 | 25–40 |
| α-methyl styrene | 0 to 40 | 5–30 |
| α,β-unsaturated dicarboxylic acid | 0 to 10 | 0–5 |
| α,β-unsaturated monocarboxylic acid | 20 to 60 | 30–50 |
| $C_{1-8}$alkyl ester of (meth)acrylic acid | 0 to 10 | 0–5 |
| Half Ester of Dicarboxylic Acid or Anhydride and Polyethylene glycol mono alkyl ether | 1 to 10 | 2–8 |

The number average molecular weight of the resulting polymers ranges from 1,500 to 20,000. When the molecular weight is higher than about 20,000, the polymer may be ineffective as a dispersant. The weight average molecular weight of the resulting polymers typically ranges from 2,500 to 15,000.

Solvents are typically used in establishing a medium for the polymerization of the styrene, unsaturated carboxylic acid and half ester. The only restrictions on the solvent are that, (a) the resin which is produced is soluble in the solvent, (b) the solvent has a boiling point above the temperature at which polymerization is conducted (although the polymerization could be conducted under super atmospheric pressure), (c) that the boiling point of the solvent be low enough that the solvent can be removed by vacuum stripping, preferably below about 225° C.; higher temperatures can discolor the resin, and (d) the solvent, preferably, have some water solubility, so that when an ammoniacal solution of the resin is made, traces of the solvent will not cause the solution to be hazy. Examples of solvents include: propylene glycol methyl ether acetate, dipropylene glycol methyl ether acetate, propylene glycol n-butyl ether acetate, dimethyl sulfoxide, N,N,N',N' tetramethyl urea, dipropylene glycol dimethyl ether, dipropylene glycol t-butyl ether, dipropylene glycol n-butyl ether, tripropylene glycol methyl ether, Several variations to the process can be employed in producing the polymeric dispersant. For example, one can form the half ester prior to polymerization of the monomers; one can effect polymerization and formation of the half ester in situ and one can effect polymerization and then effect esterification of the carboxyl functionality. To better control esterification of the carboxyl functionality in the polymer, the half ester is formed by utilizing an α, β-unsaturated dicarboxylic acid anhydride as opposed to the α,β-unsaturated dicarboxylic acid. Reactivity of the anhydride, vis-a-vis, the carboxyl group of the α,β-unsaturated monocarboxylic acid, is much greater and thereby better controls the amount of ester in the final copolymer. When forming the half ester employing an anhydride, little esterification of the carboxyl functionality of the α,β-unsaturated monocarboxylic acid results.

Polymerization is effected in conventional delay addition manner, i.e., the monomers are added incrementally over the polymerization period. In so doing, one feeds the monomer streams and initiator stream to the reactor at pre-determined rates, while maintaining the reacting mixture at a pre-determined temperature. When polymerization is complete, the solvent is removed preferably under vacuum. The viscous, essentially 100% solids, liquid resin is cooled in a suitable manner and the solid resin processed into a usable form. Typical methods include flaking on a cooled cylindrical drum, belt flaking, or extrusion into an air or water cooled pelletizer.

Suitable polymerization temperatures can range from about 50° to 300° C.; depending on the thermal stability of the free radical initiator. Since significant chain transfer is needed during the polymerization in order to obtain the relatively low molecular weight resins desired and since mercaptan chain transfer agents can cause color and odor problems, the preferred polymerization temperature is from about 125° to about 250° C.

While almost any free radical generating initiator known in the art can be used, preferred initiators when carrying out the polymerization at 125° to 250° C., include di-t-butyl peroxide; di-t-amyl peroxide; 2,5-di-t-butylperoxy-2,5-dimethylhexane; 2,5-di-t-butylperoxy-2,5-dimethylhexyne-3; 1,3-bis(α-t-butylperoxy-(α-methylethyl)benzene; cumyl-t-butyl peroxide; and the like.

The polymers are particularly effective as dispersants for both inorganic and organic pigments. Examples include calcium carbonate, titanium dioxide, satin white, cadmium yellows and so forth.

The following examples are intended to illustrate various embodiments of the invention and are not intended to restrict the scope thereof.

EXAMPLE 1 (CONTROL)

Polymerization In Dipropylene Glycol Methyl Ether

A resin was prepared following the procedure of Example 1. The reactor charge was 348 g of dipropylene glycol methyl ether (DPM). The monomer delay consisted of 170.1 g (1.63 moles) of styrene, 170.1 g (1.44 moles) of α-methyl styrene, and 106.5 g (1.48 moles) of acrylic acid. The initiator delay consisted of 6 g of di-t-butyl peroxide dissolved in 71.3 g of DPM. The monomer delay was added to the reactor over a 150-minute period and the initiator delay over a 180-minute period. At 40 minutes into the monomer delay addition, 38.6 g (0.54 moles) of acrylic acid was added to the delay, at 80 minutes, 23.4 g (0.33 moles) of acrylic acid, and at 120 minutes, 13.3 g (0.18 moles) of acrylic acid. The solvent was removed by stripping under high vacuum.

The isolated resin was a colorless, friable solid having an acid number of 214. A 30% solids aqueous solution of the ammonium salt of the resin had a viscosity of 1,655 cps (Brookfield viscosity, #3 spindle @20 rpm). The $T_g$ was 106.9° C. and the $M_n$ was 3,033 and the $M_w$ was 7,269 Daltons.

The experimental control was compared to a commercial dispersant for effectiveness. The data are for a pigment dispersion consisting of the comparative resins, red pigment, water and defoamer. The higher the reading, the greater efficiency of the resin as a pigment dispersant. Gloss was measured with a BYK Chemie Color Gloss Computer.

| Resin | 60° Gloss Readings[1] |
|---|---|
| Vancryl 68[2] | 70.5/69.9/47.7 |
| Example 1(control) | 59.9/59.0/40.7 |

1. The readings are from a coating of the dispersion on a "Penopac" form 1A card which is used throughout the graphic arts industry to measure gloss, haze, color strength and for color matching. The sequential values are for a coated black surface, a coated white surface and an uncoated white surface, respectively.

2. Vancryl 68 is a commercial pigment dispersant manufactured by APCI. It is manufactured by polymerizing styrene, α-methylstyrene and acrylic acid in diethylene glycol monoethyl ether.

Since commercially available resin pigment dispersants are manufactured in diethylene glycol monoethyl ether, a HAPs solvent, it appeared logical to replace it with dipropylene glycol methyl ether, a non HAPs solvent. However, as shown by the data, the resulting resin is inferior in performance to the commercial pigment dispersant.

EXAMPLE 2

Formation of Maleic Half Ester of the Monoethyl Ether of Polyethylene Glycol and Polymerization With Styrene and Acrylic Acid A two-liter glass reactor was equipped with an agitator, thermocouple, reflux condenser, and ports for feeding liquid streams as well as nitrogen to the reactor. The reactor was heated with an electric mantle. To the reactor was charged 309 g of dipropylene glycol monomethyl ether (sold under the trademark Dowanol DPM™) as solvent for the polymerization. Monomer delays were prepared, one consisting of 204.9 g (1.97 moles) of styrene, 204.9 g (1.74 moles) of α-methyl styrene, and 6.8 g (0.047 moles) of di-t-butyl peroxide and the second consisting of 220 g (3.1 moles) of acrylic acid and a maleic half ester, the half ester formed by dissolving 62.7 g (0.64 mole) of maleic anhydride and 210 g (0.6 mole) of the monomethyl ether of polyethylene glycol ether having a molecular weight range from 335 to 365 (sold under the trademark Carbowax 350™) at about 60° C. The maleic half ester was cooled prior to mixing with the acrylic acid.

The polymerization was effected as follows: The reactor contents were heated to 175° C., monomer delay feed one was added over a 140 minute period, and monomer feed two was simultaneously added but over a 150 minute period. Polymerization was carried out at 175° +/- 3° C. under a nitrogen atmosphere. When the additions were completed, the reaction mixture was held at temperature for 15 minutes, then the solvent was removed by stripping under high vacuum.

The yield of polymer was 869.1 g and was a friable, colorless solid. The acid number measured in methanol was 160. The acid number was also determined in an acetone/water mixture. (For the latter determination, approximately one gram weighed to four significant figures of the polymer was dissolved in 100 g of acetone.) When the polymer was completely dissolved, 5 g of water and 1 ml of 0.500N hydrochloric acid was added to the polymer solution. The mixture was then stirred at room temperature for 30 minutes. The acid number (adjusted for the presence of the hydrochloric acid) was then determined by titration with 0.100N methanolic potassium hydroxide. The acid number measured by the second procedure was 164. The closeness of the two acid numbers indicates that there is little, if any recyclization of the half acid ester back to the anhydride during the polymerization. The $T_g$ as determined by differential scanning calorimetry was 35° C. The number average molecular weight ($M_n$) was 3,000 and the weight average molecular weight ($M_w$) was 6,250.

EXAMPLE 3

Simultaneous Polymerization and Formation of Maleic Half Ester

A resin incorporating the maleic half ester was prepared following the general polymerization procedure of Example 2. The procedure differed in that the maleic half ester was formed in situ during polymerization rather than prior to polymerization. More specifically, the reactor was charged with 200 g of DPM recovered from previous resin preparations. A single monomer delay was prepared by first dissolving 38.8 g (0.40 moles) of maleic anhydride in a mixture of 234.7 g (3.26 moles) of acrylic acid and 129.8 g (0.37 moles) of Carbowax 350. When the maleic anhydride was completely dissolved, 204.9 g (1.97 moles) of styrene and 204.9 g (1.74 moles) of α-methylstyrene were added. The initiator solution consisted of 6.3 g of di-t-butyl peroxide and 50 g of DPM.

The reactor charge was heated to 175° C. in a nitrogen atmosphere. The monomer solution and initiator solution were added to the reactor over 150 minutes while maintaining the temperature at 175°–179° C. After all the monomer and initiator had been added, the polymer solution was held at 177° C. for 15 minutes to convert any residual monomer to polymer.

The solvent and fragments from the initiator, primarily acetone and t-butyl alcohol, were stripped from the polymer under high vacuum at 180°–195° C. The molten polymer was poured into a stainless steel pan to cool and solidify. The resin yield was 862.3 g. The acid number was 181, the $T_g$, 49.7° C., the $M_n$ was 4,264 and the $M_w$ 9,940 Daltons.

The resin was converted to an aqueous dispersion as follows: A resin solution was prepared from 63 g of polymer, 13 g of aqua ammonia, and 128 g of water. The pH of the solution was 7.83; the viscosity, 890 cps (RV viscometer, #3 spindle at 20 rpm; and the solids content, 30.66%.

EXAMPLE 4

Formation of Maleic Half Ester of the Monoethyl Ether of Polyethylene Glycol and Polymerization With Styrene and Acrylic Acid This procedure employed herein was essentially identical to Example 3 except that the level of maleic half ester and acrylic acid were reduced. The reactor charge was 100 g of dipropylene glycol methyl ether acetate (DPM acetate) and there was a single feed to the reactor. The peroxide was dissolved in the monomer mixture. The amounts of monomers were the same except less Carbowax 350 (84 g), less maleic anhydride (25.1 g) and less acrylic acid (220.8 g) were used.

The resin yield was 736.9 g. The $T_g$ was 95.4° C.; the acid number, 233.8.

A resin solution was prepared. The solids content was 32.94%; the viscosity, 1735 cps; and the pH, 8.60.

The acid number for this resin was higher than that of the Example 3 resin because of the change of solvent. In Example 3, there was some esterification of the acrylic acid carboxyl groups in the polymer by the DPM solvent; DPM contains a terminal hydroxyl group which is modestly reactive with carboxyl functionality. There is far less esterification of the carboxyl group of the acrylic acid in the resin of this example because of very little ester interchange with the DPM acetate. On the other hand, the $T_g$ of the Example 4 resin is higher because it contains less of the Carbowax 350 half acid ester of maleic acid than the Example 3 resin. The incorporation of the half acid ester depresses the $T_g$ of the resin.

EXAMPLES 5 TO 12

Effect Of Ratio Of Acrylic Acid To Half Acid Ester

In order to determine the influence of the half acid ester content of the resin on its performance as a pigment dispersant, a ladder experiment was carried out. The ratio of acrylic acid to half acid ester was varied while keeping the carboxyl content of the resin constant. The total carboxyl content of the monomer charge was 3.69 equivalents. All other ingredients and processing conditions were the same as Example 3.

Examples 5 and 6 were identical except that fresh solvent was used in Example 5 while all other examples used recycled DPM acetate solvent from the previous example. The polymers were analyzed for acid number. and Tg. The polymers were neutralized with ammonia and the percent solids and viscosity measured. The resins are characterized in Table 1.

COMPARATIVE EXAMPLE 14

Polymer Prepared From Maleic Half Ester of Ethoxylated Nonylphenol

The procedure and recipe were identical to Example 13 except that Aerosol MEM-1012-6 by MEM-NP-9.5 Surfactant [MEM-NP-9.5 is the half acid ester of an ethoxylated nonylphenol having an average of 9.5 ethoxy groups and maleic acid.

The isolated resin was a pale yellow, friable solid having an acid number of 186. The $T_g$ is 93.9° C. A 30% solids aqueous solution of the ammonium salt of the resin had a viscosity of 2,325 cps (Brookfield viscosity, #3 spindle @20 rpm) and a pH of 9.3.

TABLE 1

| Example | 5 | 6 | 7 | 8 | 9 | 10 | 11 | 12 |
|---|---|---|---|---|---|---|---|---|
| Resins | | | | | | | | |
| % Yield[1] | 97.1 | 99.9 | 99.5 | 97.0 | 101.1[2] | 105.1[2] | 95.4 | 95.2 |
| Acid # | 219.3 | 209.9 | 244.7 | 184.5 | 230.9 | 266.2 | 215.8 | 235.5 |
| Tg, °C. | | 78.7 | 96.3 | 42.9 | 107.1 | 145.8 | 78.4 | 135.4 |
| % Half Ester[3] | 20.75 | 20.75% | 14.35% | 31.26% | 7.51% | 0% | 20.83% | 13.53% |
| Properties of the Ammonium Salt Solution | | | | | | | | |
| % Solids | 37.34 | 35.44% | 33.66% | 38.55% | 30.82% | 29.84% | 36.24% | 32.18% |
| pH | 8.60 | 8.55 | 8.66 | 8.6 | 8.6 | 8.63 | 8.57 | 8.78 |
| Viscosity (cps) RV#3 @ 20 | 1640 | 1725 | 1935 | 1775 | 1375 | 1600 | 1810 | 1705 |

[1]Yield-g of resin/g monomers × 100 (total grams to reactor).
[2]Incomplete removal of solvent.
[3]All half esters are of Carbowax 350, except for Examples 11 and 12. Example 11 is the half ester of maleic anhydride and Carbowax 550 (molecular weight 525 to 575) and Example 12 is the half acid ester of maleic anhydride and triethylene glycol monomethyl ether.

The table shows that the polymers exhibited little difference over the range of acid numbers from about 200 to 270 and the the viscosities of the aqueous solutions were similar. As noted previously, as the percent of the maleic half ester in the polymer decreased, the Tg increased to a high of about 145° C. where in Example 10 no maleic half ester was employed.

COMPARATIVE EXAMPLE 13

Polymer Incorporating Maleic Half Acid Ester of Ethoxylated Dodecyl Alcohol

The process of Example 2 was generally followed. To the reactor was charged 300 g of recovered DPM. The monomer charge consisted of 170.1 g of styrene, 170.1 g of α-methylstyrene, 106.5 g of acrylic acid, and 52 g of Aerosol™ MEM-1012-6 Surfactant [MEM-1012-6 is the half acid ester of maleic acid and an ethoxylated dodecyl alcohol (degree of ethoxylation of about 10). The initiator solution consisted of 6 g of di-t-butyl peroxide dissolved in 71.3 g of recovered DPM.

Monomer delays were added to the reactor over a 150 minute period and an initiator delay was added over a 180 minute period. At 40 minutes into the monomer delay addition, 38.6 g of acrylic acid was added, at 80 minutes, 23.4 g of acrylic acid, and at 120 minutes, 13.3 g of acrylic acid.

The isolated resin was a pale yellow, friable solid having an acid number of 200. The $T_g$ is 87.8° C. A 30% solids aqueous solution of the ammonium salt of the resin had a viscosity of 840 cps (Brookfield viscosity, #3 spindle @20 rpm) and a pH of 8.9.

The Example 13 and 14 resins were evaluated against the commercial dispersant, Vancryl 68, as described in Example 1.

| Gloss Readings of Pigment Dispersions | |
|---|---|
| Example | 60° Gloss |
| Vancryl 68 | 71/70/47 |
| 13 | 64/64/43 |
| 14 | 63/63/45 |

Examples 13 and 14 illustrate that resin polymers having pendent ethoxylated alcohols or ethoxylated alkylphenols are not effective pigment dispersants. Example 13 and 14 resins are clearly inferior to the commercial, Vancryl 68 dispersant and thus unsuited. The coatings also were very hazy.

EXAMPLE 15

Determination of Effectiveness of Polymers As Pigment Dispersant Through Color Measurements
General Procedure:

Pigment dispersions were used to make pigmented printing inks and were made from ammonium salt solutions of the various carboxylated styrene polymers generally described above. To make a dispersion, the polymer was first dissolved in an alkaline water solution, with ammonium hydroxide being the preferred base. The polymer was typically dissolved at 30–35% solids to a pH of 8.5 in a high speed dissolving mixer. To about 30 parts of this solution was added from at about 30–35 parts water, and at about 30–35 parts colored pigment of a lithol rubine. Also, 0.1–1 part of defoamer was added, depending on need.

These materials were mixed together with a high speed mixer to premix the dispersion and then through a media mill, which combines high speed mixing and media or shot, for bombarding the pigment particles to reduce the particle agglomerates to the original pigment single particle size. The dispersion was normally run to a 7+ Hegman dispersion, indicating that very few if any agglomerates remain in the liquid dispersion. Finished inks were made by adding other polymers, water, and additives in small levels to the pigment dispersion. The dispersion normally comprised about 15–60% of the finished ink formulation.

The effectiveness of the polymers as pigment dispersants was measured through its ability to enhance color. Color was measured as follows.

COLOR MEASUREMENTS

L*a*b* values are used to measure color by color computers.

L* is the measure of how light or dark a color is. A reading of 100 indicates that the color is completely white, and at 0 the color is completely black.

a* is a measure which indicates the hue on the red to green axis, with −60 equivalent to green, and +60 the equivalent of red.

b* is an measure which indicates the yellow to blue range of the color. At b* values of +60, the color is yellow, and at −60 the color is blue.

Using these three values, L*a*b*, any color can be described. In the case of colors known as blue shade reds, such as lithol rubine, a lower L* value indicates a stronger color as more of the white background is blocked out by the stronger color strength. Similarly, a higher a* value would indicate more "redness" or more strength, and a less negative b* value would indicate less "blueness" A blue shade red color becomes bluer to the eye as the strength of color gets weaker. In terms of measuring the effectiveness of a polymer as a dispersant, the higher the L* and a* number and the lower the b* number, the greater ability of the polymer to disperse the pigment.

Figure 1:
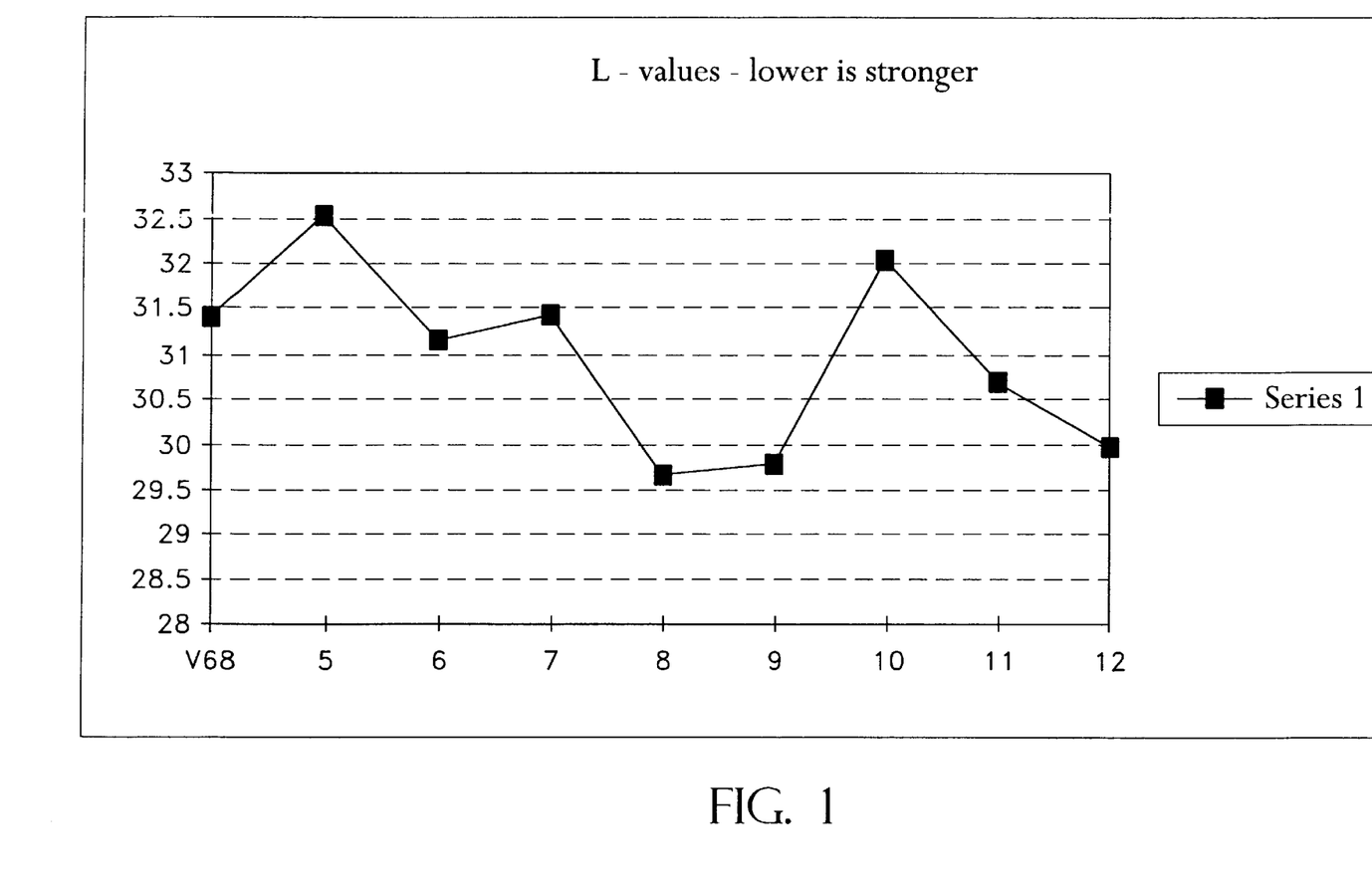
FIG. 1 is a plot of the L* color value verses the polymers of Examples 5–12.
Figure 2:
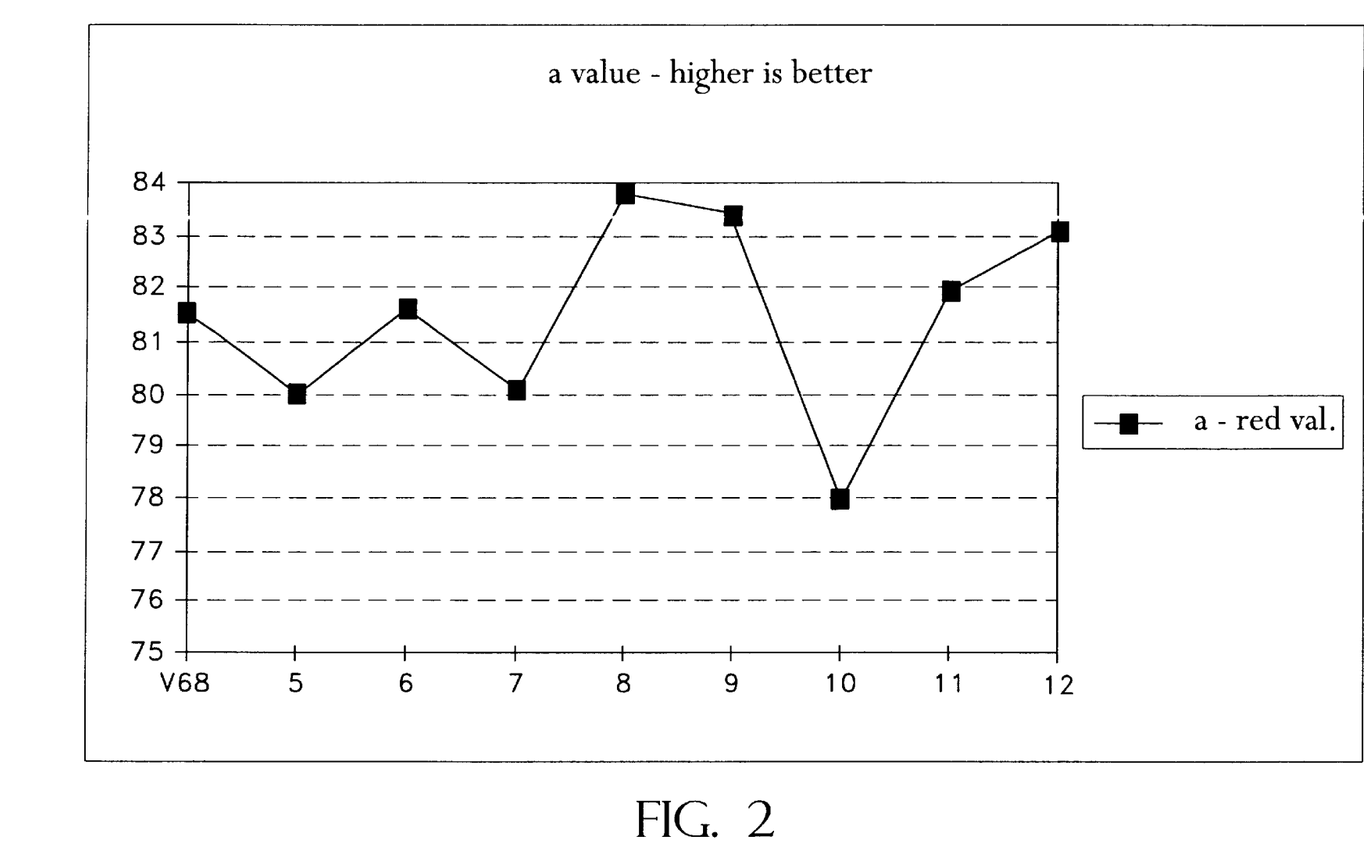
FIG. 2 is a plot of the a* color value verses the polymers of Examples 5–12.
Figure 3:
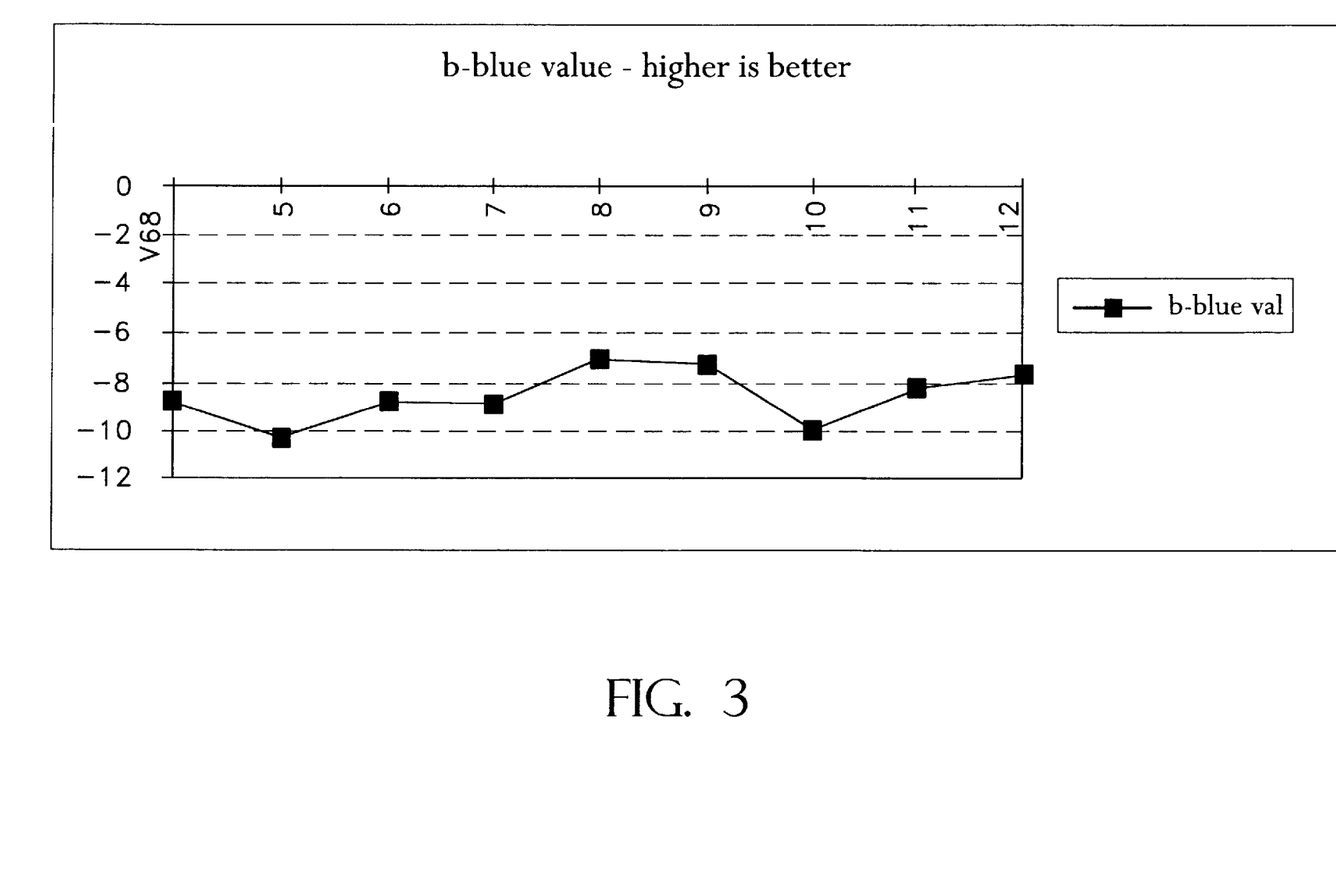
FIG. 3 is a plot of the b* color value verses the polymers of Examples 5–12.

Examples 5–12 were evaluated for strength and measured against a commercial styrene/acrylic acid copolymer prepared in diethylene glycol monoethyl ether sold under the trademark Vancryl 68 by Air Products & Chemicals, Inc. The commercial copolymer has an acid number of from 160 to 180. The results of the color test are set forth in Table 2. FIGS. 1–3 are plots of the color strength measurements for the polymers tested.

TABLE 2

Pigment Dispersion Evaluation

| Example | L strength | a — red val. | b — blue val. |
|---|---|---|---|
| V68* | 31.42 | 81.5 | −8.88 |
| 5 | 32.57 | 80.0 | −10.35 |
| 6 | 31.14 | 81.6 | −8.85 |
| 7 | 31.4 | 80.11 | −8.97 |
| 8 | 29.65 | 83.82 | −7.1 |
| 9 | 29.77 | 83.39 | −7.33 |
| 10 | 32 | 78 | −10.16 |
| 11 | 30.68 | 81.9 | −8.43 |
| 12 | 29.95 | 83.06 | −7.78 |

A Vancryl 68 dispersant by Air Products & Chemicals, Inc.

Performance Ranking

| Examples | | |
|---|---|---|
| "L", lower is better | "a", higher is better | "b", higher is better |
| 8 | 8 | 8 |
| 9 | 9 | 9 |
| 12 | 12 | 12 |
| 11 | 11 | 11 |
| 6 | 6 | 6 |
| 7 | V68 | V68 |
| V68 | 7 | 7 |
| 10 | 5 | 5 |
| 5 | 10 | 10 |

Conclusions

The data indicate that the polymers of Examples 8, 9 and 12 are the best pigment dispersants, in fact, they are superior to the commercial pigment dispersant. The poor value for example 10 can be explained by the fact that the resin contained no half ester. The values for Example 5 cannot be explained as the data is inconsistent with other results.

The performance of a pigment dispersant is dependent on many factors, some of which are interdependent. These factors include molecular weight, acid number, glass transition temperature, level of half acid ester.

Summarizing the examples, even though, Example 12 was prepared employing the half ester of maleic anhydride and triethylene glycol mono methyl ether and this glycol is classified as a "Hazardous Air Pollutant" because it contains three ethylene oxide units, it performed well. Conversely, Example 1 (control) which employed dipropylene glycol monomethyl ether as the solvent and is a homologue of diethylene glycol monoethyl ether which was the solvent for Vancryl 68 dispersant and contained no half acid ester as with the other polymers was a very poor pigment dispersant. Dipropylene glycol monomethyl ether would have been the logical choice for this application because it is not designated a hazardous air pollutant. However, as the data show, it did not work.

Polymers of Examples 13 and 14 containing maleic half acid esters of ethoxylated alkyl (Example 13) or ethoxylated aryl (Example 14) alcohols, were, surprisingly, very poor pigment dispersants. The gloss of drawdowns of these pigment dispersions were lower in gloss than that for dispersions made with the Vancryl 68 dispersant. The drawdowns were also hazy which would make the resins commercially unacceptable. It is believed that the pendent hydrophobe groups of the dodecyl group and the nonylphenyl group, adversely impacted the dispersant properties.

What is claimed is:

1. In a polymer suited as a pigment dispersant comprised of polymerized units of styrene, and an α,β-unsaturated monocarboxylic acid and said polymer incorporating hydrophilic functionality, the improvement which comprises incorporating hydrophilic functionality based upon the half acid ester of an α,β-unsaturated dicarboxylic acid or anhydride thereof and a polyethylene glycol monoalkyl ether having greater than three ethylene oxide units.

2. The polymer of claim 1 wherein one mole polymer is comprised of polymerized units in the following approximate proportions:

| Monomer | Mole Percentage Range |
|---|---|
| Styrene | 20 to 60 |
| α-methyl styrene | 0 to 40 |
| α,β-unsaturated dicarboxylic acid | 0 to 10 |
| α,β-unsaturated monocarboxylic acid | 20 to 60 |
| $C_{1-8}$ alkyl ester of (meth)acrylic acid | 0 to 10 |
| Half Ester of α,β-Unsaturated Dicarboxylic Acid or Anhydride and Polyethylene glycol mono alkyl ether | 1 to 10 |

3. The polymer of claim 2 wherein the number average molecular weight of the resulting polymer ranges from 1,500 to 20,000.

4. The polymer of claim 3 wherein the α,β-unsaturated monocarboxylic acid in said polymer comprises acrylic acid.

5. The polymer of claim 4 wherein the α,β-Unsaturated Dicarboxylic Acid or anhydride is maleic anhydride.

6. The polymer of claim 5 wherein the acid number of the polymer is from 100 to 400.

7. The polymer of claim 6 which comprises styrene, α-methyl styrene, the polyethyleneglycol monoalkyl ether of maleic anhydride, and acrylic acid.

8. The polymer of claim 7 wherein the polyethylene monoalkyl ether has a molecular weight of from 164 to 5,000.

9. The polymer of claim 7 wherein the polymer is formed from the following monomer composition which consists essentially of:

| Monomer | Mole Percentage Range |
|---|---|
| styrene | 25–40 |
| α-methyl styrene | 5–30 |
| α,β-unsaturated monocarboxylic acid | 30–50 |
| half ester of maleic anhydride and polyethylene glycol mono alkyl ether | 2–8 |

10. The polymer of claim 9 wherein the number average molecular weight of the polyethylene glycol monoether used to form the half ester is from 300 to 600.

11. The polymer of claim 10 wherein the pendent R group of the polyether glycol monoether is selected from the group consisting of methyl, ethyl, and propyl and butyl.

12. The polymer of claim 9 wherein the polyethyleneglycol monoalkyl ether is the monomethyl ether of a polyethylene glycol ether having a molecular weight range from 335 to 365.

* * * * *